US009103283B2

(12) United States Patent
LeBlanc et al.

(10) Patent No.: US 9,103,283 B2
(45) Date of Patent: Aug. 11, 2015

(54) SPHERICAL-LINK END DAMPER SYSTEM WITH NEAR CONSTANT ENGAGEMENT

(75) Inventors: Ryan Edward LeBlanc, Glastonbury, CT (US); Kevin J. Cummings, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 669 days.

(21) Appl. No.: 13/527,682

(22) Filed: Jun. 20, 2012

(65) Prior Publication Data

US 2013/0343876 A1 Dec. 26, 2013

(51) Int. Cl.
*F01D 17/10* (2006.01)
*F02C 9/18* (2006.01)

(52) U.S. Cl.
CPC ............ *F02C 9/18* (2013.01); *F05D 2260/30* (2013.01); *F05D 2260/606* (2013.01); *F05D 2260/96* (2013.01); *Y10T 74/2142* (2015.01)

(58) Field of Classification Search
CPC ......... F02C 9/18; F01D 17/10; F01D 17/105; F01D 17/14; F01D 17/141; Y10T 74/2142; F16K 21/16; F16K 21/14; F05D 2260/30; F05D 2260/606; F05D 2260/96; F05D 2270/333; F04D 27/0215; F04D 29/40; F04D 15/0011; F04D 15/0038; F04D 29/464
USPC ................. 285/33, 148.14, 148.21, 148.2
See application file for complete search history.

(56) References Cited

U.S. PATENT DOCUMENTS

| 3,030,006 | A | 4/1962 | Shoup, Jr. |
| 3,996,964 | A | 12/1976 | McCombs |
| 4,177,013 | A | 12/1979 | Patterson et al. |
| 4,827,713 | A | 5/1989 | Peterson et al. |
| 5,380,151 | A * | 1/1995 | Kostka et al. ............... 415/145 |
| 6,086,326 | A | 7/2000 | Honda et al. |
| 6,106,227 | A | 8/2000 | Honda et al. |
| 6,802,691 | B2 | 10/2004 | Chlus |
| 7,594,403 | B2 | 9/2009 | Cadieux |
| 7,850,419 | B2 | 12/2010 | Vrljes et al. |
| 2004/0096315 | A1 | 5/2004 | Chlus |
| 2008/0131266 | A1 | 6/2008 | Vrljes et al. |
| 2009/0317229 | A1 | 12/2009 | Suciu et al. |
| 2010/0158663 | A1 | 6/2010 | Colotte et al. |

FOREIGN PATENT DOCUMENTS

| EP | 0902179 A2 | 3/1999 |
| JP | 2003148167 A | 5/2003 |

OTHER PUBLICATIONS

International Search Report, Sep. 13, 2013, PCT/US2013/046715.

* cited by examiner

*Primary Examiner* — Edward Look
*Assistant Examiner* — Aaron R Eastman
(74) *Attorney, Agent, or Firm* — Kinney & Lange, P.A.

(57) ABSTRACT

A link includes a link body with two ends, a ring bore with a ring bore axis and a bearing, a mount bore with a mount bore axis and a bearing. The link also has an end curvature at the end having the ring bore wherein the curvature axis is substantially perpendicular to the ring bore axis.

14 Claims, 7 Drawing Sheets

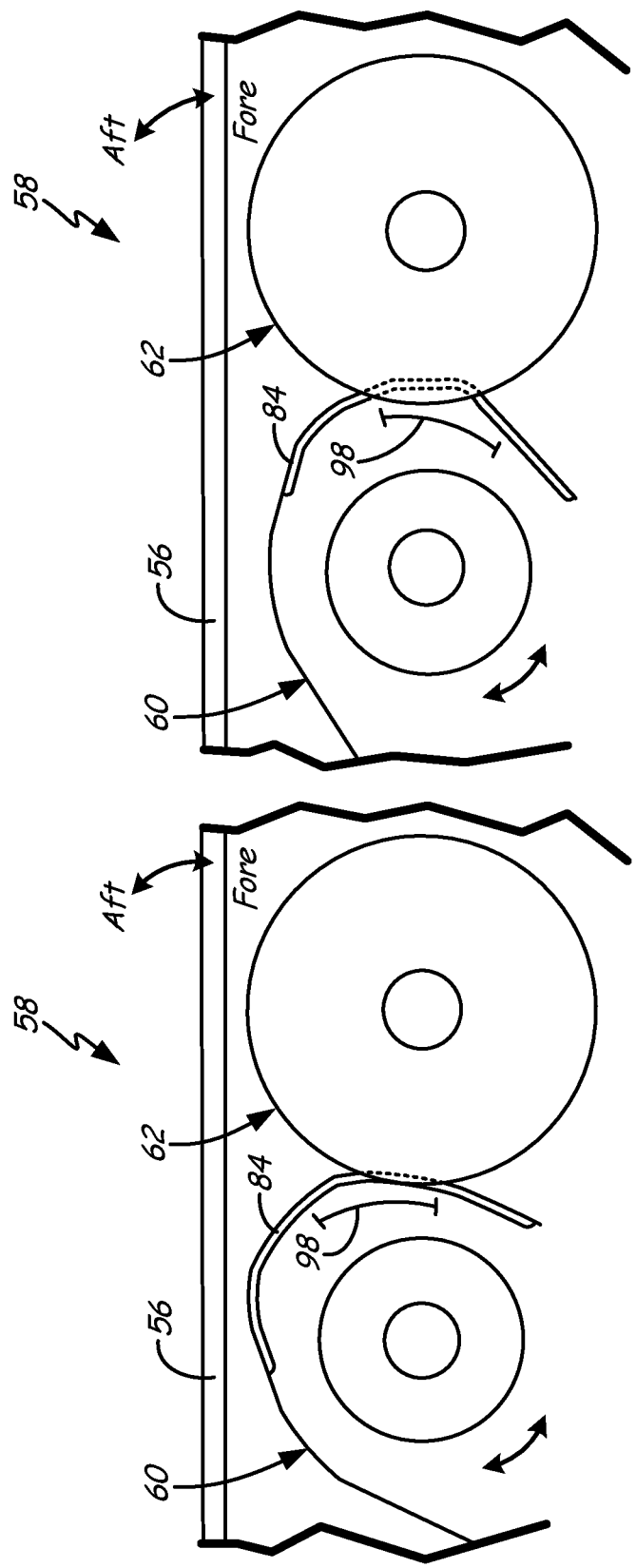

SPHERICAL-LINK END DAMPER SYSTEM WITH NEAR CONSTANT ENGAGEMENT

BACKGROUND

The present invention relates generally to gas turbine engines, and more particularly to a movable mechanical link of a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

During start-up of a gas turbine engine, the low pressure turbine is not providing power to turn the low pressure compressor. Therefore, the low pressure compressor includes a bleed valve to vent the air from the low pressure compressor so that rotating the low pressure compressor is easier. In addition, during acceleration and deceleration, the output of the low pressure compressor may need to be vented in order to maintain pressure balance between the low and high pressure compressors to prevent stalling thereof. (These are only two examples of why a bleed valve is placed in the low pressure compressor.) Due to its location, the bleed valve components are subject to vibrational loads that can be damaging if not sufficiently dampened. This requires a damping mechanism that is both flexible to absorb motion and durable in order to prevent failure.

SUMMARY

In accordance with the present invention, a link includes a link body with two ends, a ring bore with a ring bore axis and a bearing, a mount bore with a mount bore axis and a bearing. The link also has an end curvature at the end having the ring bore wherein the curvature axis is substantially perpendicular to the ring bore axis.

In another embodiment, a damping arrangement includes a valve ring having two bores, a link, and a damper. The link includes a ring bore with a ring bore axis, a mount bore, and an end having end curvature. The damper includes an attachment bore with an attachment bore axis that is substantially parallel to the ring bore axis of the link.

In another embodiment, a gas turbine engine includes a low pressure compressor having a case and a bleed valve circumferentially surrounding the low pressure compressor. The bleed valve includes a bleed valve case having a seal seat, a valve ring, a plurality of link brackets, a plurality of dampers, and a plurality of links. Each of the plurality of links is adjacent to a damper and has an end curvature that is in contact with the adjacent damper.

BRIEF DESCRIPTION OF THE DRAWINGS

FIG. 6A is a top view of the damping arrangement showing interaction between the idler link and a damper when the bleed valve is in a closed position.

FIG. 6B is a top view of the damping arrangement showing interaction between the idler link and a damper when the bleed valve is in an open position.

DETAILED DESCRIPTION

Figure 1:
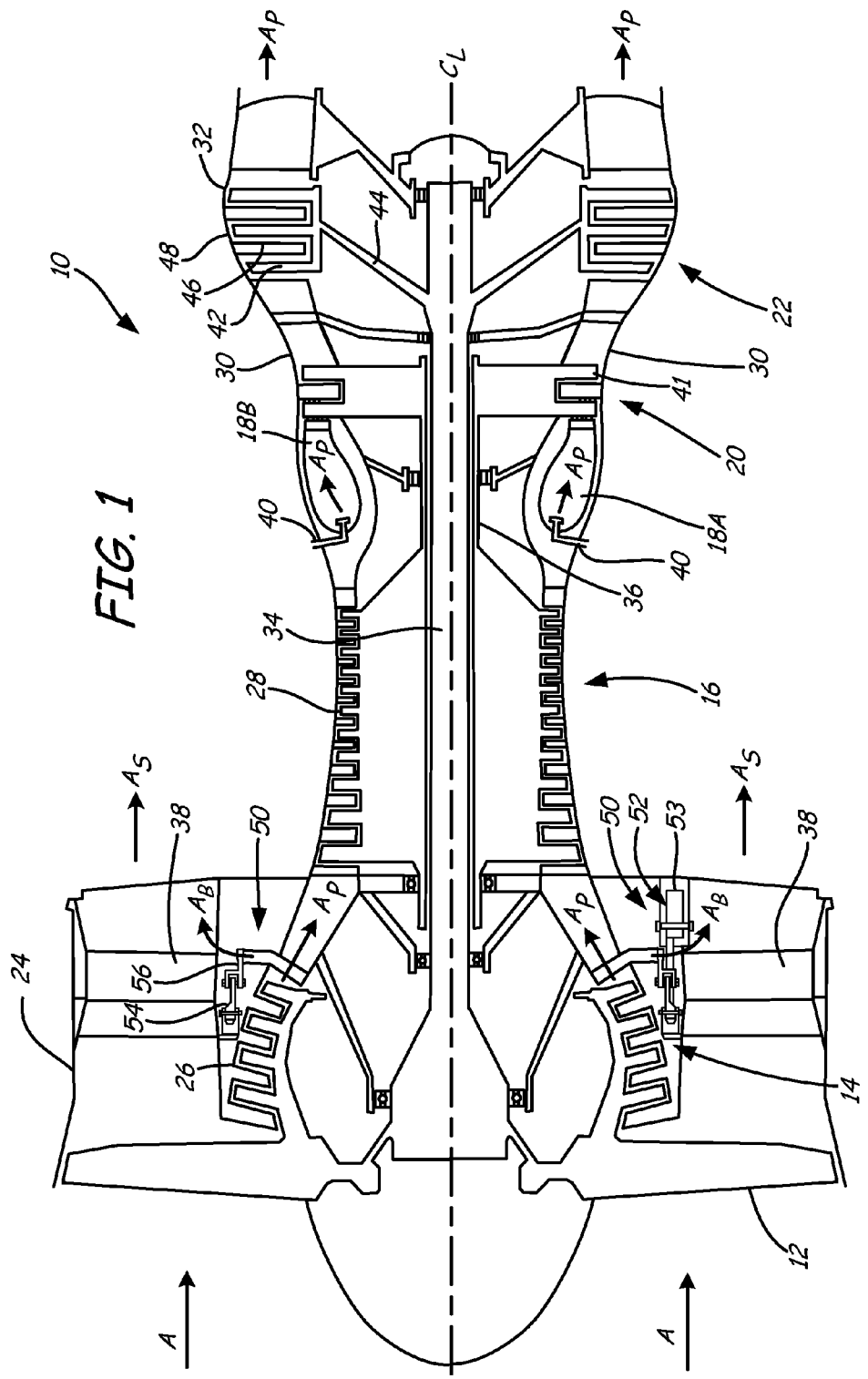
FIG. 1 is a schematic side cross-section view of a gas turbine engine.

FIG. 1 shows a cross section of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, case section 48, bleed valve 50, bleed valve actuation assembly 52, bleed valve idler assembly 54, bleed valve ring 56, inlet air A, primary air $A_P$, secondary air $A_S$ (also known as bypass air), bleed air $A_B$, and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, low pressure compressor (LPC) 14, high pressure compressor (HPC) 16, combustor section 18, high pressure turbine (HPT) 20, and low pressure turbine (LPT) 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by low pressure turbine 22 through low pressure shaft 34 (either directly as shown or through a gearbox, not shown) to accelerate secondary air $A_S$ (also known as bypass air) through exit guide vanes 38, thereby producing a major portion of the thrust output of engine 10. Primary air $A_P$ (also known as gas path air) is directed first into low pressure compressor 14 and then into high pressure compressor 16. LPC 14 and HPC 16 work together to incrementally step up the pressure of primary air $A_P$. HPC 16 is rotated by HPT 20 through low pressure shaft 34 to provide compressed air to combustor section 18. The compressed air is delivered to combustors 18A-18B, along with fuel through injectors 40, such that a combustion process can be carried out to produce the high energy gases necessary to turn high pressure turbine 20 and low pressure turbine 22. Primary air $A_P$ continues through gas turbine engine 10 whereby it is typically passed through an exhaust nozzle to further produce thrust.

After being compressed in LPC 14 and HPC 16 and participating in a combustion process in combustors 18A-18B (FIG. 1) to increase pressure and energy, primary air $A_P$ flows through HPT 20 and LPT 22 such that blades 32 and blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns fan 12 and LPC 14.

Bleed valve 50 is attached to LPC case 26 and annularly surrounds LPC 14. As stated previously, it is advantageous to open bleed valve 50 at particular times. In the illustrated embodiment, this occurs by bleed valve actuator assembly 52 (specifically actuator 53) forcing bleed valve ring 56 forward with assistance from a plurality of bleed valve idler assemblies 54 (although only one is shown in FIG. 1). When bleed valve 50 is open, some of primary air $A_P$ flows through bleed valve 50 which is shown as bleed air $A_B$. This bleed air $A_B$ joins secondary air $A_S$ and is expelled from gas turbine engine 10.

The components and configuration of gas turbine engine 10 as shown in FIG. 1 allow for primary air $A_P$ to be exhausted from LPC 14 into the atmosphere. This reduces the force required to turn low pressure shaft 34 (ex. during start-up) and can be used to balance LPC 14 and HPC 16 to prevent compressor stall (ex. during acceleration or deceleration).

Depicted in FIG. 1 is one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

Figure 2:
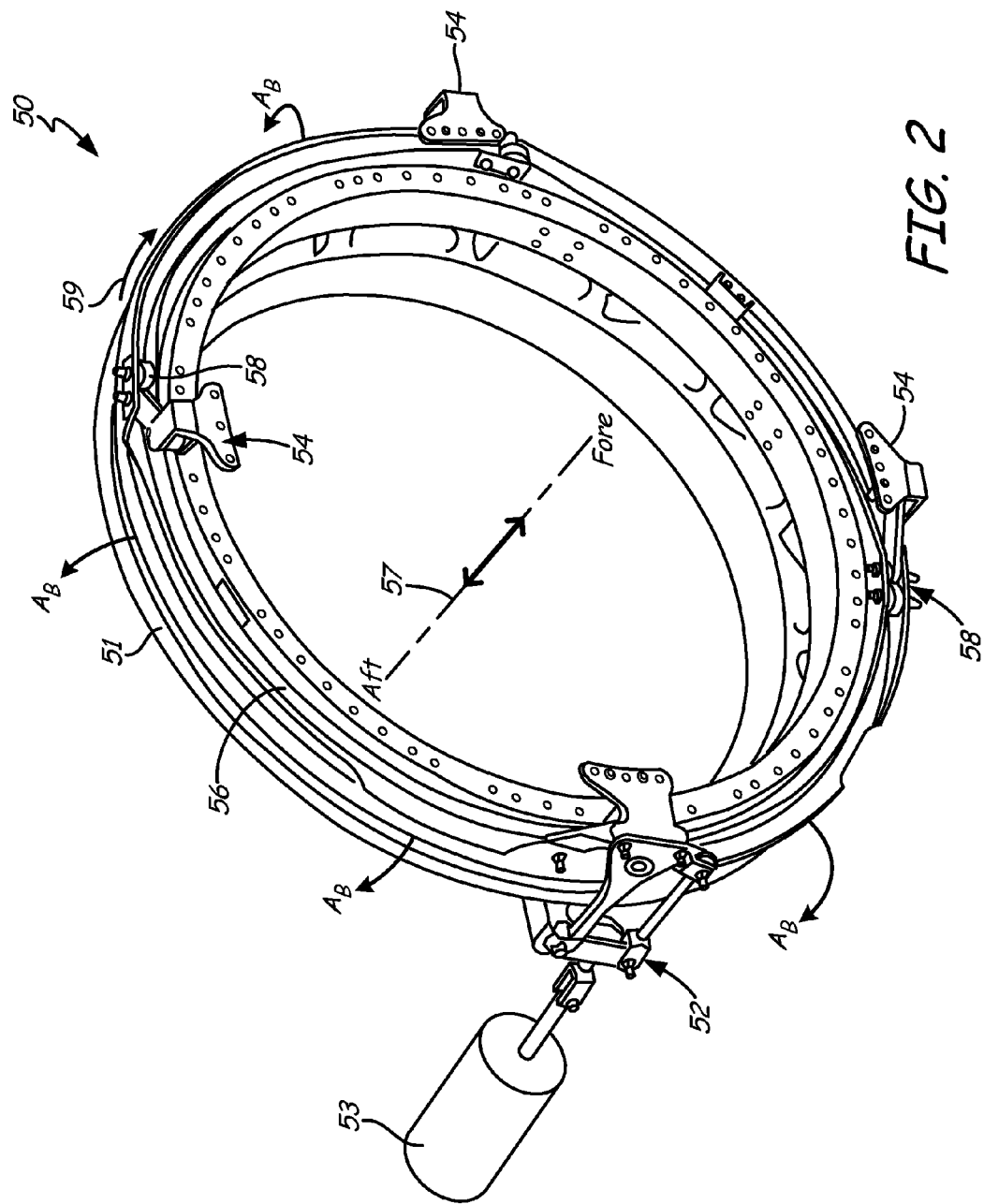
FIG. 2 is a perspective view of a bleed valve.

In FIG. 2, a perspective view of bleed valve 50 is shown. Bleed valve 50 is connected to LPC case 26 (shown in FIG. 1) on the fore and aft sides of bleed valve 50. Bleed valve 50 includes bleed valve case 51, bleed valve actuation assembly 52 (with actuator 53), a plurality of bleed valve idler assemblies 54 (which each have a damping arrangement 58, although only two are visible in FIG. 2), and bleed valve ring 56. In the illustrated embodiment bleed valve actuation assembly 52 is attached to bleed valve case 51, although the connection between bleed valve actuation assembly and LPC case 26 is not shown and neither are the connections between LPC case 26 and bleed valve idler assemblies 54. This is because LPC case 26 has been removed for greater visibility of bleed valve 50 in FIG. 2.

In the illustrated embodiment, bleed valve 50 is shown in the closed position. Around the aftmost edge of bleed valve ring 56 is a bulb seal (not shown) that interfaces with a seal seat on a radially extending flange (not shown) of bleed valve case 51. In this position, bleed valve ring 56 prevents bleed air $A_B$ from escaping out of LPC 14 (shown in FIG. 1).

As stated previously, bleed valve actuation assembly 52 exerts forward force on bleed valve ring 56 in order to open bleed valve 50. As bleed valve ring 56 moves forward along bleed valve axis 57, bleed valve ring 56 is guided by bleed valve idler assemblies 54. Due to the multiple linkage arrangement of bleed valve 50, bleed valve ring 56 rotates slightly (as indicated by circumferential arrow 59) as bleed valve ring 56 moves forward. As stated previously when bleed valve 50 is open, bleed air $A_B$ escapes from LPC 14 (shown in FIG. 1) substantially around the entire circumference of bleed valve 50.

While bleed valve ring 56 is constrained in place by being held against bleed valve case 51 when in the closed position, once bleed valve 50 is opened, bleed valve ring 56 is substantially less stabilized by bleed valve case 51. Therefore, bleed valve ring 56 is subject to vibrations that propagate throughout gas turbine engine 10 (shown in FIG. 1). In addition, buffeting from escaping bleed air $A_B$ can cause bleed valve ring 56 to vibrate. Damping arrangements 58 constrain the movement of bleed valve ring 56 when bleed valve 50 is in the open position.

The components and configuration of bleed valve 50 as shown in FIG. 2 allow for bleed valve 50 to bleed air out of LCP 14 (shown in FIG. 1) while preventing bleed valve ring 56 from damaging itself or other nearby components.

Depicted in FIG. 2 is one embodiment of the present invention, to which there are alternative embodiments. For example, bleed valve 50 can be arranged such that bleed valve ring 56 moves aftward in order to open, as the designations of directions such as "aft" and "fore" are merely descriptive of the illustrated embodiment.

Figure 3:
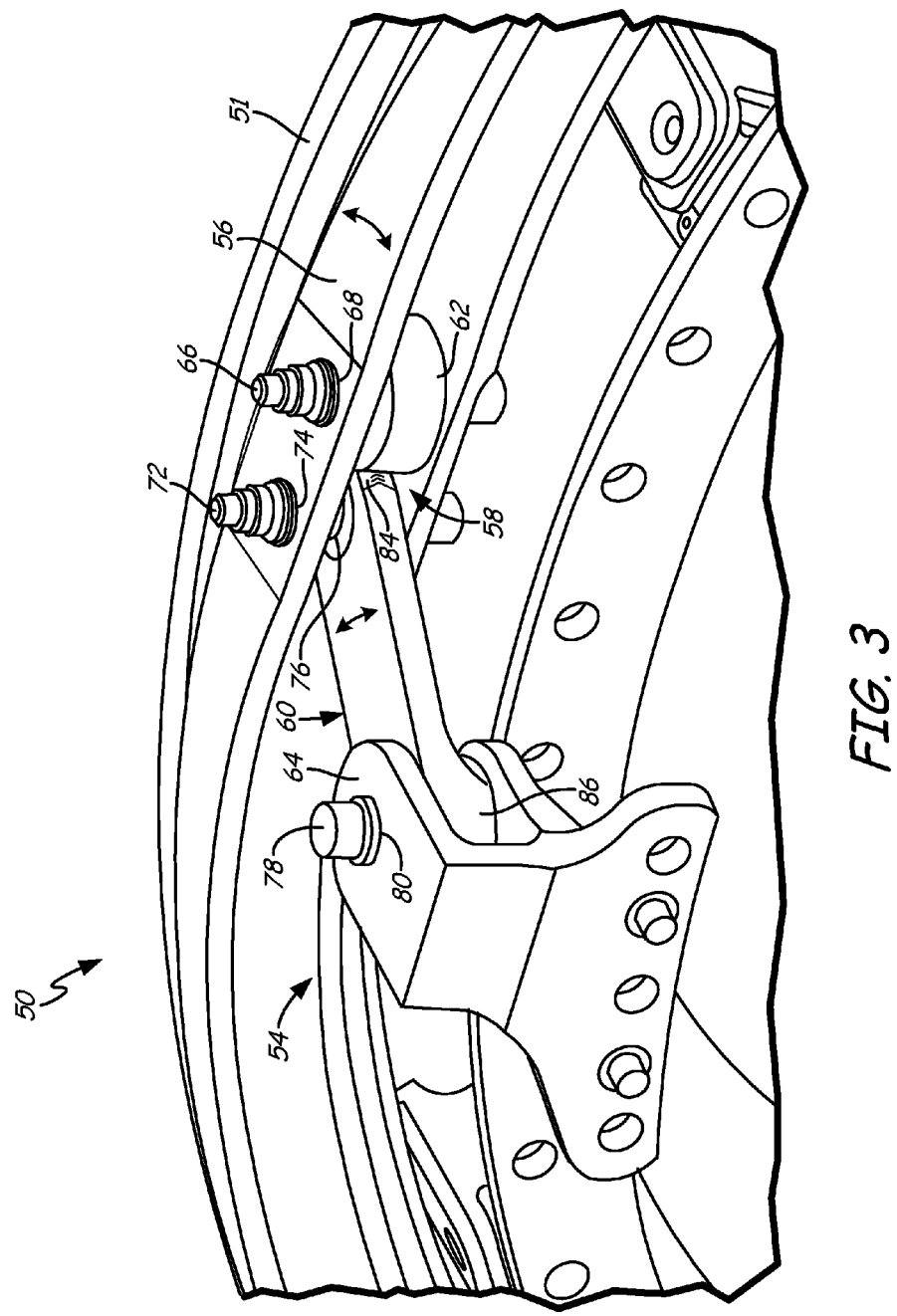
FIG. 3 is a perspective view of a bleed valve idler assembly including a damping arrangement.

In FIG. 3, a perspective view of bleed valve idler assembly 54 including damping arrangement 58 is shown. Shown in FIG. 3 are bleed valve 50 with bleed valve ring 56 and bleed valve idler assembly 54, the latter of which includes damping arrangement 58, idler link 60, damper 62, and idler bracket 64.

Damper 62 is rotatably attached to bleed valve ring 56 by damper bolt 66 which runs through damper bore 68 in bleed valve ring 56 and attachment bore 70 (shown in FIG. 4) in damper 62. Idler link 60 is rotatably attached to bleed valve ring 56 by link bolt 72 which runs through link bore 74 in bleed valve ring 56 and ring bore 76 in idler link 60. Idler link 60 is also rotatably attached to idler bracket 64 by mount bolt 78 which runs through bracket bore 80 in idler bracket 64 and mount bore 82 (shown in FIG. 5) in idler link 60.

In damping arrangement 58, idler link 60 is in contact with damper 62. More specifically, damper 62 contacts an end of idler link 60 having end curvature 84. Damper bore 68 and link bore 74 are sufficiently close together to cause damper 62 to elastically deform due to idler link 60. This is because, in the illustrated embodiment, damper 62 is comprised of an elastic damping material, such as silicone rubber, whereas idler link 60 is comprised of a rigid material, such as aluminum. The inefficiency of damper 62 to transfer vibrational loads dampens bleed valve 50 when bleed valve 50 is in the open position.

At the opposite end of idler link 60 from end curvature 84 is boss 86. Boss 86 is positioned on the radially inward side of idler link 60 and substantially surrounds mount bore 82 (shown in FIG. 4). Boss 86 orients idler link 60 with respect to idler bracket 64 such that idler link 60 can be attached to bleed valve ring 56. If idler link 60 were oriented upside-down during assembly of bleed valve 50, boss 86 would cause idler link 60 to crash into bleed valve ring 56.

The components and configuration of bleed valve idler assembly 54 as shown in FIG. 3 allow for bleed valve ring 56 to be damped, which reduces the possibility of damage to bleed valve 50 due to vibration during operation of gas turbine engine 10 (shown in FIG. 1). In addition, idler link 60 includes boss 86, which is a mistake-proofing feature that does not allow for incorrect assembly of idler link 60 into bleed valve 50.

Figure 7A:
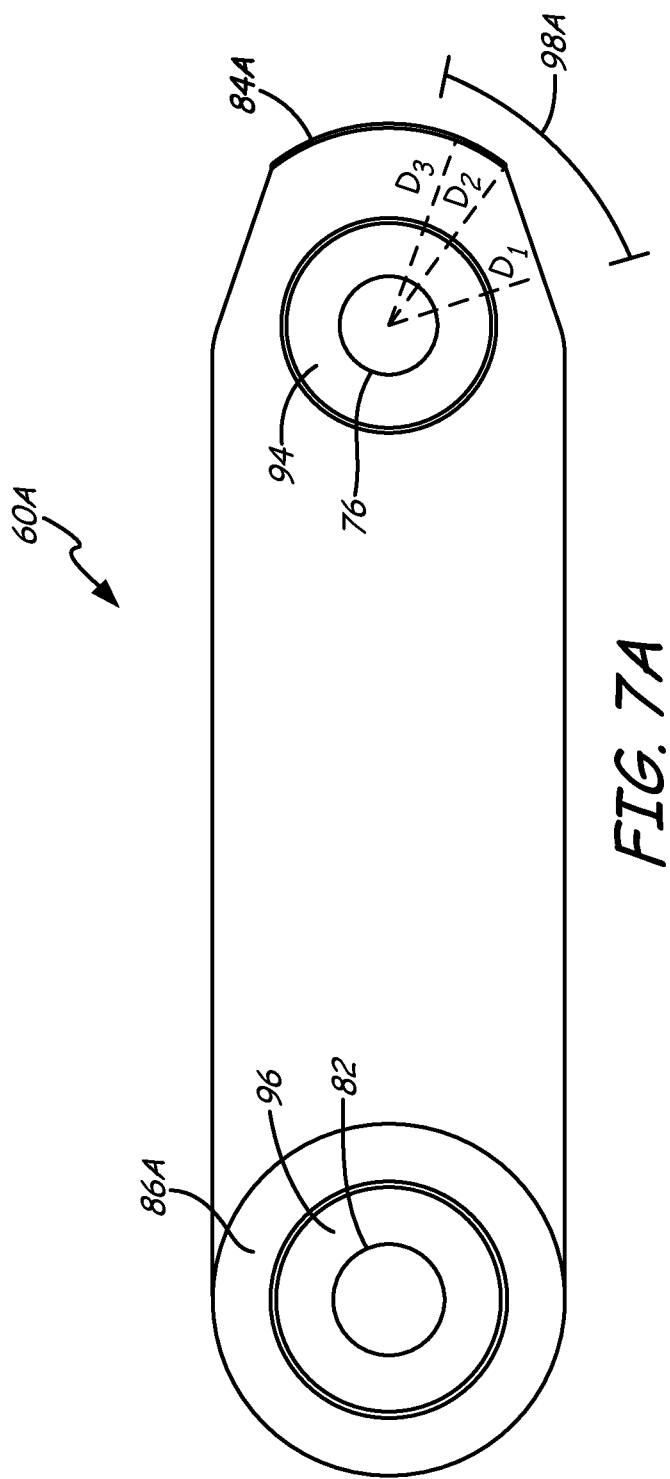
FIG. 7A is a top view of an alternate embodiment idler link.
Figure 7B:
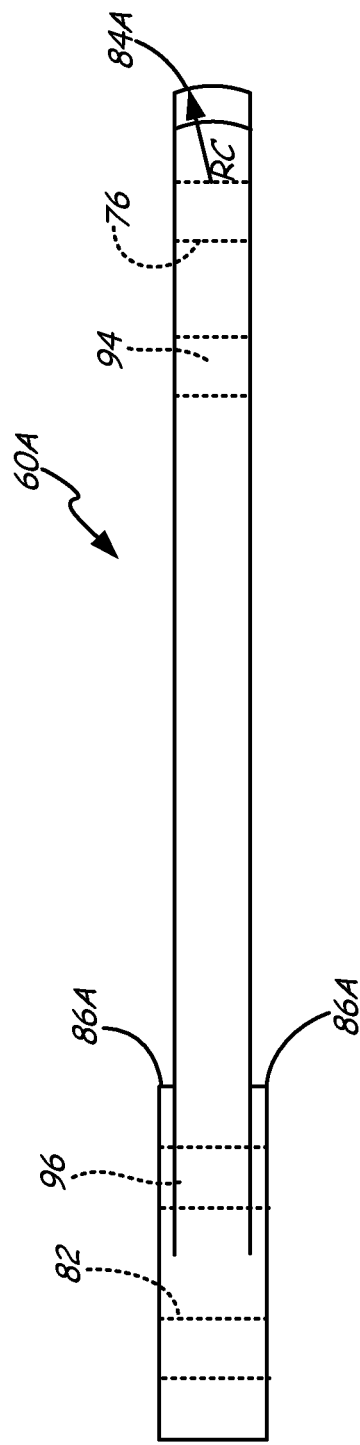
FIG. 7B is a side of the alternate embodiment idler link.

Depicted in FIG. 3 is one embodiment of the present invention, to which there are alternative embodiments. For example, idler link 60 does not require a mistake proofing feature such as boss 86. For another example, an alternative embodiment idler link 60A is shown in FIGS. 7A-7B.

Figure 4:
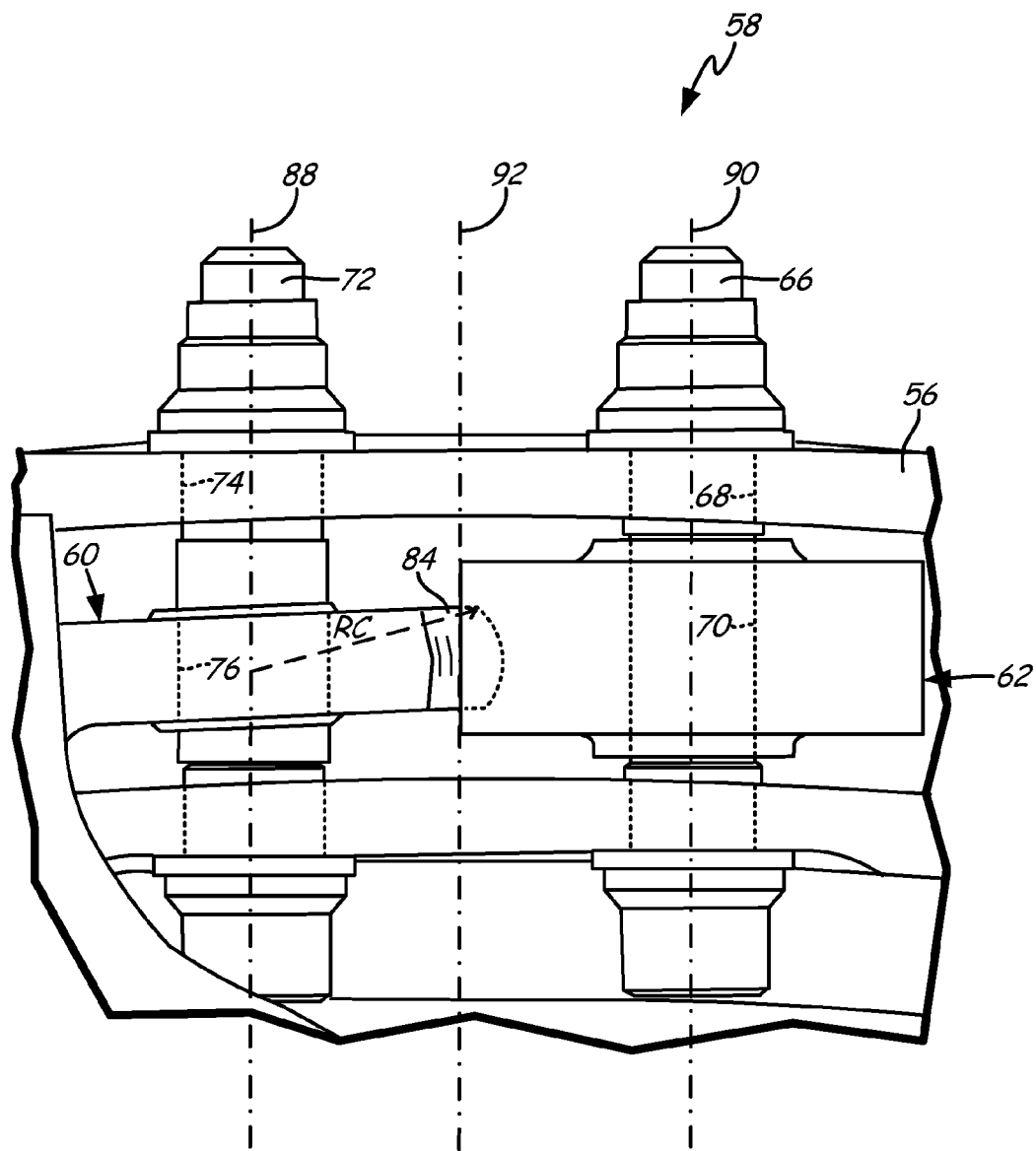
FIG. 4 is a front view of the damping arrangement including axes of rotation.

In FIG. 4, a front view of damping arrangement 58 is shown. Shown in FIG. 4 are bleed valve ring 56, idler link 60, and damper 62. As stated previously, idler link 60 is connected to bleed valve ring 56 through ring bore 76 and link bore 74, and damper 62 is connected to bleed valve ring 56 through attachment bore 70 and damper bore 68. Ring bore 76 is oriented along ring bore axis 88, and attachment bore 70 is oriented along attachment bore axis 90. Ring bore axis 88 and attachment bore axis 90 are substantially parallel to contact radius 92 wherein contact radius 92 starts at valve ring axis 57 (shown in FIG. 2) and extends radially outward between idler link 60 and damper 62.

In addition, end curvature 84 of idler link 60 is shown in phantom. In the illustrated embodiment, end curvature 84 has radius of curvature RC. End curvature 84 is shaped as an arc with radius of curvature RC is swept along the side of idler link 60. This results in end curvature 84 having a shape that is generated by radius of curvature RC being rotated about a curvature axis that is perpendicular to ring bore axis 88 at the middle of the height of idler link 60. The length of radius of curvature RC is equal to distance $D_1$, with distance $D_1$ being the distance between ring bore axis 88 and the edge of idler link 60 (shown in FIG. 5). In the illustrated embodiment, radius of curvature RC is substantially constant along the entire length of end curvature 84. In addition, the length of idler link 60 is 6.35 cm (2.50 inches) in this embodiment and the radius of curvature RC is 1.65 cm (0.650 inches).

The components and configuration of damping arrangement 58 as shown in FIG. 4 allow for idler link 60 to contact and press into damper 62 without cutting into damper 62. This is because end curvature 84 reduces the extent to which the edges of idler link 60 are forced into damper 62 which reduces the shear force along those edges. In addition, ring bore axis 88 and attachment bore axis 90 are substantially parallel, so the distance between idler link 60 and damper 62 is constant along their respective sides. This means that when bleed valve ring 56 rotates while opening, idler link 60 rides up along damper 62 only the minimum amount possible for such a damping arrangement 58. (This would not be the case if ring bore axis 88 and attachment bore axis 90 were purely radial, as the amount of protrusion into damper 62 at the radially outermost portion of idler link 60 would be less than at the radially innermost portion of idler link 60. This would force idler link 60 to ride up damper 62.)

Depicted in FIG. 4 is one embodiment of the present invention, to which there are alternative embodiments. For example, contact radius 92 can extend from valve ring axis 57 to edge curvature 84, to the edge of damper 62, or anywhere in the vicinity. Regardless of the exact vector along which contact radius 92 runs, ring bore axis 88 and attachment bore axis 90 will be substantially parallel because they are both substantially parallel to contact radius 92.

Figure 5:
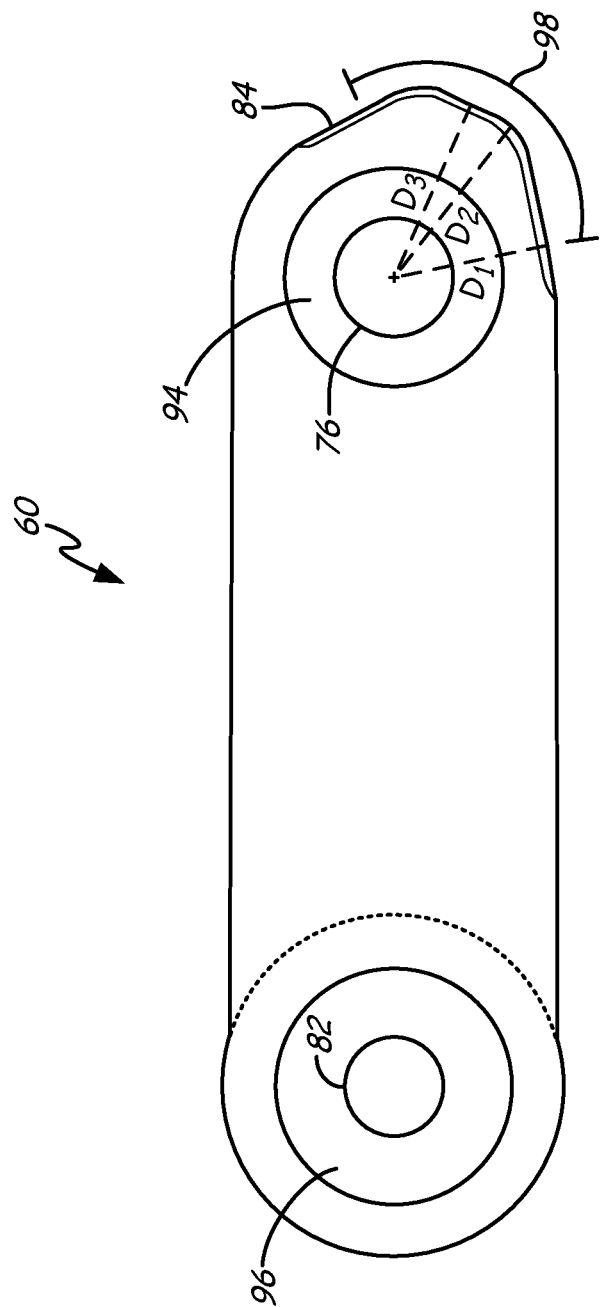
FIG. 5 is a top view of an idler link showing end curvature.

In FIG. 5, a top view of idler link 60 including end curvature 84 is shown. Idler link 60 includes first bearing 94 and second bearing 96. In the illustrated embodiment, second bearing 96 is a cylindrical bearing, and first bearing 94 is a spherical bearing (in order to compensate for the slight twisting of link bolt 72 (shown in FIG. 3) when bleed valve ring 56 (shown in FIG. 3) rotates when moved forward).

In the illustrated embodiment, end curvature 84 extends along only a portion of the perimeter of idler link 60. This portion includes contact region 98, which is the portion of idler link 60 that is contacted by damper 62 (shown in FIG. 2) during operation of bleed valve 50 (shown in FIG. 2). The remainder of idler link 60 has a substantially different perimeter profile, for example, a straight perimeter as shown in this embodiment.

Contact region 98 has a round contour that is neither constant nor constantly changing. In the illustrated embodiment, distance $D_1$ is smaller than distance $D_2$, but distance $D_2$ is substantially similar to distance $D_3$. Such a camming contour dictates the amount of compression imposed on damper 62, as will be shown later with FIG. 6. As alluded to previously with respect to FIG. 5, in the illustrated embodiment, the length of idler link 60 is 6.35 cm (2.50 inches) and distance $D_1$ is 1.65 cm (0.650 inches).

The components and configuration of idler link 60 as shown in FIG. 5 allow for idler link 60 to have a simple to manufacture shape around the majority of its perimeter while including end contour 84 in at least contact region 98.

In FIG. 6A, a top view of damping arrangement 58 is shown with bleed valve 50 (shown in FIG. 2) in a closed position. In FIG. 6B, a top view of damping arrangement 58 is shown with bleed valve 50 in an open position. Shown in FIGS. 6A-6B are idler link 60 and damper 62 and the interaction therebetween. Both FIGS. 6A and 6B will now be discussed together.

FIG. 6A shows bleed valve ring 56 in its aftmost position. As stated previously, in this position bleed valve ring 56 is being stabilized by its bulb seal being forced against bleed valve case 51 (shown in FIG. 2). This means that the damping effect provided by damping arrangement 58 is not critical, so contact region 98 of idler link 60 does not extend far into damper 62. FIG. 6B shows bleed valve ring 56 in its foremost position. As stated previously, in this position bleed valve ring 56 is not being stabilized by its bulb seal, so the damping effect provided by damping arrangement 58 is critical. Therefore, contact region 98 of idler link 60 extends farther into damper 62 than when bleed valve ring 56 is in its aftmost position, increasing the available damping force of damping arrangement 58. Moreover, the camming contour of contact region 98 as described previously with respect to FIG. 5 allows for the damping force to escalate rapidly after only a little movement of bleed valve ring 56. This effect is beneficial because the bulb seal provides no damping force once bleed valve ring 56 is moved away from its seal seat.

The components and configuration of damping arrangement 58 as shown in FIGS. 6A-6B allow for the position of bleed valve ring 56 and the geometry of idler link 60 to dictate the amount of damping force provided by damping arrangement 58. This allows for maximum damping when bleed valve 50 (shown in FIG. 2) is open and allows for most of the force from bleed valve actuation assembly 52 (shown in FIG. 2) to be used to hold bleed valve 50 closed.

Depicted in FIGS. 6A-6B is one embodiment of the present invention, to which there are alternative embodiments. For example, damper 62 does not need to be rotatably attached to bleed valve ring 56. In such an embodiment, idler link 60 slides across damper 62 when bleed valve ring 56 is moved.

In FIG. 7A, a top view of alternate embodiment idler link 60A is shown. In FIG. 7B, a side view of alternate embodiment idler link 60A is shown. FIGS. 7A-7B will now be discussed simultaneously. In the illustrated embodiment, end curvature 84A extends along only a portion of the perimeter of idler link 60A. This portion overlaps with contact region 98A, but not all of contact region 98 has end curvature 84A. The remainder of idler link 60A has a substantially different perimeter profile, for example, a straight perimeter as shown in this embodiment. The length of radius of curvature RC (the measurement of the curvature of end curvature 84A) is equal to distance $D_1$, which is the distance between ring bore axis 88 and the edge of idler link 60A at distance $D_1$. In the illustrated embodiment, radius of curvature RC is substantially constant along the entire length of end curvature 84.

In the illustrated embodiment, contact region 98A has a straight section adjacent to a circular contour such that distance $D_1$ is smaller than distance $D_2$, but distance $D_2$ is substantially the same as distance $D_3$. Such a camming contour dictates the amount of compression imposed on damper 62, and ensures that end curvature 84A of idler link 60A is contacting damper 62 at maximum compression (shown in FIG. 6B).

At the opposite end of idler link 60A from end curvature 84A are two bosses 86A. One boss 86A is positioned on the radially inward side of idler link 60A, and another boss 86A is positioned on the radially outward side of idler link 60A. Both bosses 86A substantially surround mount bore 82 and are substantially the same height. Therefore, bosses 86A orient idler link 60A in the center of idler bracket 64 (shown in FIG. 3) for attachment to bleed valve ring 56. Because the end of idler link 60A having end curvature 84A is symmetric and bosses 86A are of equal heights, idler link 60A can be assembled either right-side-up or upside-down without consequence. This is a different form of mistake proofing as opposed to the one shown in FIG. 3.

The components and configuration of idler link 60A as shown in FIGS. 7A-7B allow for ease of manufacturing due to its simpler shape that only requires end curvature 84A to be applied to an end of idler link 60A that has a substantially circular contour. In addition, idler link 60A retains its mistake-proof quality by being symmetric.

It should be recognized that the present invention provides numerous benefits and advantages. For example, damping arrangement 58 can have a longer life span because damper 62 less likely to become damaged due to its interaction with idler link 60. In addition, the damping force from damping arrangement 58 is rapidly altered from minimum (when it is not required) to maximum (when it is necessary).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A link includes a link body having a first end and a second end; and a ring bore through the link body at the first end, the ring bore having a ring bore axis; a first bearing positioned in the ring bore; a mount bore through the link body at the second end, the mount bore including a mount bore axis; and a second bearing positioned in the mount bore; wherein the first end has an end curvature with a curvature axis that is substantially perpendicular to the ring bore axis.

The link of the preceding paragraph can optionally include, additionally and/or alternatively, any one or more of the following features, configurations, and/or additional components:

the end curvature can have a single radius of end curvature;

the remainder of the link body other than the first end can have a different profile from the end curvature of the first end;

a contact region can have a side contour such that a first distance between the ring bore axis and the contact region is shorter than a second distance therebetween, and a third distance between the ring bore axis and the contact region is substantially the same as the second distance therebetween;

the first bearing can be a spherical bearing and the second bearing is a cylindrical bearing; and/or a boss can extend from the link body and can substantially surrounds the mount bore.

A damping arrangement for a link includes a valve ring that includes a link bore and a damper bore; a link that includes a ring bore with a ring bore axis; a mount bore; and a first end with an end curvature; wherein the link is attached to the valve ring at the link bore through the ring bore; and a damper includes an attachment bore with an attachment bore axis, wherein the damper is attached to the valve ring at the damper bore through the attachment bore; wherein the ring bore axis and the attachment bore axis are substantially parallel.

The damping arrangement of the preceding paragraph can optionally include, additionally and/or alternatively, any one or more of the following features, configurations, and/or additional components:

a link bracket can be rotatably attached to the link bracket through the mount bore;

a contact radius can extend radially outward from a valve ring axis through an interface between the link and the damper, wherein the ring bore axis is substantially parallel to the contact radius;

the link bore and the damper bore can extend generally radially through the valve ring;

the end curvature can have a single radius of end curvature;

the remainder of the link body other than the first end can have a different profile from the end curvature of the first end;

a contact region can have a side contour such that a first distance between the ring bore axis and the contact region is shorter than a second distance therebetween, and a third distance between the ring bore axis and the contact region is substantially the same as the second distance therebetween;

a mount bore can extend through the link body at the second end;

a first bearing can be positioned in the ring bore of the link; and a second bearing can be positioned in the mount bore of the link; and/or a boss can extend from the link body that substantially surrounds the mount bore.

A gas turbine engine includes a low pressure compressor including a low pressure compressor case; and a bleed valve circumferentially surrounding the low pressure compressor, the bleed valve comprising a bleed valve case attached to the low pressure compressor case; the bleed valve case having a seal seat, a valve ring positioned radially outwardly from and surrounding the bleed valve case; the valve ring movable between an open position and a closed position wherein the valve ring contacts the seal seat when the valve ring is in the closed position; a plurality of link brackets attached to at least one of the bleed valve case or the low pressure compressor case a plurality of dampers rotatably connected to the valve ring; and a plurality of links, each link being rotatably connected to the valve ring at a first end adjacent to a damper and each link being rotatably connected to a link bracket, respectively; wherein the first end of each link has an end curvature that is in contact with the adjacent damper.

The gas turbine endine of the preceding paragraph can optionally include, additionally and/or alternatively, any one or more of the following features, configurations, and/or additional components:

each link of the plurality of links can be attached to the valve ring through a ring bore in the respective link, the ring bore having a ring bore axis; wherein each damper in the plurality of dampers can be attached to the valve ring through an attachment bore in the respective damper, the attachment bore having an attachment bore axis; and wherein the ring bore axis of each link and the attachment bore axis of the adjacent damper can be substantially parallel;

a link body can have a first end and a second end; and a ring bore can extend through the link body at the first end, the ring bore can have a ring bore axis; and a first bearing can be positioned in the ring bore; wherein the end curvature on the first end has a curvature axis that can be substantially perpendicular to the ring bore axis; and/or a bellcrank assembly can be attached to at least one of the bleed valve case or the low pressure compressor case and rotatably can be attached to the valve ring; and an actuator can be attached to the bellcrank assembly for moving the valve ring between the open position and the closed position.

The invention claimed is:

1. A damping arrangement for a link, the damping arrangement comprising:
    a valve ring including a link bore and a damper bore;
    a link including:
        a ring bore with a ring bore axis;
        a mount bore; and
        a first end with an end curvature;
        wherein the link is attached to the valve ring at the link bore through the ring bore; and
    a damper including:
        an attachment bore with an attachment bore axis;
        wherein the damper is attached to the valve ring at the damper bore through the attachment bore;
    wherein the ring bore axis and the attachment bore axis are substantially parallel.

2. The damping arrangement of claim 1, and further comprising:
    a link bracket;
    wherein the link is rotatably attached to the link bracket through the mount bore.

3. The damping arrangement of claim 1, and further comprising:
    a contact radius extending radially outward from a valve ring axis through an interface between the link and the damper;
    wherein the ring bore axis is substantially parallel to the contact radius.

4. The damping arrangement of claim 1, wherein the link bore and the damper bore extend generally radially through the valve ring.

5. The damping arrangement of claim 1, wherein the end curvature has a single radius of end curvature.

6. The damping arrangement of claim 1, wherein the remainder of the link body other than the first end has a different profile from the end curvature of the first end.

7. The damping arrangement of claim 1, and further comprising:
    a contact region having a side contour such that a first distance between the ring bore axis and the contact region is shorter than a second distance therebetween, and a third distance between the ring bore axis and the contact region is substantially the same as the second distance therebetween.

8. The damping arrangement of claim 1, and further comprising:
    a mount bore through the link body at the second end.

9. The damping arrangement of claim 1, and further comprising
    a first bearing positioned in the ring bore of the link; and
    a second bearing positioned in the mount bore of the link.

10. The damping arrangement of claim 1, and further comprising:
    a boss extending from the link body that substantially surrounds the mount bore.

11. A gas turbine engine comprising:
    a low pressure compressor including a low pressure compressor case; and
    a bleed valve circumferentially surrounding the low pressure compressor, the bleed valve comprising:
        a bleed valve case attached to the low pressure compressor case, the bleed valve case having a seal seat;
        a valve ring positioned radially outwardly from and surrounding the bleed valve case, the valve ring movable between an open position and a closed position wherein the valve ring contacts the seal seat when the valve ring is in the closed position;
        a plurality of link brackets attached to at least one of the bleed valve case or the low pressure compressor case;
        a plurality of dampers rotatably connected to the valve ring; and
        a plurality of links, each link being rotatably connected to the valve ring at a first end adjacent to a damper and each link being rotatably connected to a link bracket, respectively, wherein the first end of each link has an end curvature that is in contact with the adjacent damper.

12. The gas turbine engine of claim 11, wherein:
    wherein each link of the plurality of links is attached to the valve ring through a ring bore in the respective link, the ring bore having a ring bore axis;
    wherein each damper in the plurality of dampers is attached to the valve ring through an attachment bore in the respective damper, the attachment bore having an attachment bore axis; and
    wherein the ring bore axis of each link and the attachment bore axis of the adjacent damper are substantially parallel.

13. The gas turbine engine of claim 11, wherein the link comprises:
    a link body having a first end and a second end; and
    a ring bore through the link body at the first end, the ring bore having a ring bore axis; and
    a first bearing positioned in the ring bore;
    wherein the end curvature on the first end has a curvature axis that is substantially perpendicular to the ring bore axis.

14. The gas turbine engine of claim 11, and further comprising:
    a bellcrank assembly attached to at least one of the bleed valve case or the low pressure compressor case and rotatably attached to the valve ring; and
    an actuator attached to the bellcrank assembly for moving the valve ring between the open position and the closed position.

* * * * *